United States Patent [19]

Flamm et al.

[11] Patent Number: 4,809,059
[45] Date of Patent: Feb. 28, 1989

[54] CHROMA CONTROL CIRCUIT FOR A DIGITAL TELEVISION RECEIVER

[75] Inventors: Peter M. Flamm, Freiburg; Laurin C. Freyberger, Endingen, both of Fed. Rep. of Germany

[73] Assignee: Deutsche ITT Industries GmbH, Freiburg, Fed. Rep. of Germany

[21] Appl. No.: 944,464

[22] Filed: Dec. 19, 1986

[30] Foreign Application Priority Data

Dec. 19, 1985 [EP] European Pat. Off. ......... 85116236.2

[51] Int. Cl.$^4$ ............................................. H04N 9/64
[52] U.S. Cl. ......................................... 358/27; 358/28
[58] Field of Search ...................... 358/13, 23, 25, 27, 358/28

[56] References Cited

U.S. PATENT DOCUMENTS

| | | |
|---|---|---|
| 4,270,139 | 5/1981 | Flamm et al. |
| 4,482,916 | 11/1984 | Acampora ............................ 358/27 |
| 4,568,967 | 2/1986 | Freyberger et al. |
| 4,682,209 | 7/1987 | Nillesen ................................ 358/23 |

OTHER PUBLICATIONS

Rolf Deubert, "Digital prowness increases in color television sets," Electronics, Sep. 8, 1983, pp. 131–133.
Thomas Fischer, "Digital VLSI breeds next-generation TV receivers," ELECTRONICS, Aug. 11, 1981, pp. 97–103.

Primary Examiner—James J. Groody
Assistant Examiner—David E. Harvey
Attorney, Agent, or Firm—Thomas L. Peterson

[57] ABSTRACT

In a chroma control circuit for a digital television receiver, the system clock lies in the range of four-times the chrominance-subcarrier frequency. The originally received color-burst signal is locked in frequency and phase to the system clock by means of an all-digital phase-locked loop. The phase-difference angle between the color-burst signal and the system clock appears as a sine or cosine value in the two standard color-difference signals of the chrominance demodulator during the reception of the color-burst signal. One of the standard color-difference signals, the B-Y signal, is fed through a horizontal-frequency-suppressing loop filter to a digital oscillator. The latter determines the speed of rotation of a hue adjustment angle rotating at approximately constant angular speed. The respective sine and cosine values of the hue adjustment angle are read as data values from first and second read-only memories, respectively, and are fed to the sine and cosine inputs of a hue adjuster in a calculating stage which derives the color-burst signal and the chrominance signal.

18 Claims, 2 Drawing Sheets

CHROMA CONTROL CIRCUIT FOR A DIGITAL TELEVISION RECEIVER

BACKGROUND OF THE INVENTION

The invention pertains to a chroma control circuit for a digital television receiver.

A chroma control circuit of this kind is described in an INTERMETALL Data Book entitled "Digit 2000 VLSI Digital TV System", Freiburg/Br., June 1985, pages 163 to 174, which explain the CVPU 2210 NTSC comb-filter video processor. The chroma control circuit according to the aforementioned preambles is contained especially in FIG. 10-2 on page 165, which is described in Section 10.1.4 on page 167 and in Section 10.1.6 on page 168.

In the NTSC and PAL television standards, the hue of a picture element can be represented as an angle-coded signal with respect to a transmitter reference system. The different phase angles from 0° to 360° correspond to hues assigned thereto, the zero reference phase being the zero phase of one of the two standard color-difference signals, namely the B-Y signal. The transmitter reference system is the unmodulated chrominance subcarrier, which is suppressed during the horizontal trace period but is transmitted for a short time as a burst signal during the horizontal retrace period, the phase of the burst signal, referred to the B-Y color-difference signal, being — 180° in the case of the NTSC television standard, and +/−135° in the case of the PAL television standard.

In the prior art chroma circuit, the receiver reference system is the system clock, which has four times the frequency of, and is locked in frequency and phase to, the unmodulated chrominance subcarrier; four successive system-clock pulses, beginning with the zero phase of the B-Y color-difference signal, correspond to the phase angles of 0°, 90°, 180° and 270° of the unmodulated chrominance subcarrier. The latter, which is included in the composite color signal as mentioned above, is fed to the chroma control circuit after the chrominance and luminance components have been separated from the composite color signal by means of the chrominance filter.

In the NTSC and PAL television standards, the zero reference phase of the receiver reference system is the zero phase of the B-Y color-difference signal during the reception of the color burst. In that case, the R-Y color-difference signal is zero, and the phase comparison in the phase-locked loop is very simple.

If this chroma control circuit is to operate correctly, the chrominance subcarrier and the system clock, which has four times the chrominance-subcarrier frequency, must be locked together in frequency and phase. This is accomplished with a phase-locked loop, which causes the system clock to lock with the unmodulated chrominance subcarrier.

During the further development and improvement of this integrated chroma control circuit, the inventors discovered that the action of the phase-locked loop on the frequency and phase of the system clock is disadvantageous. For example, the phase-locked loop requires a voltage-controlled oscillator for the system clock whose deviation from the reference phase during a line period must not exceed 3°. This corresponds to a permissible deviation of the system-clock frequency of only 0.03 per mill from its nominal value if the phase difference at the beginning of the scanned line is zero. Otherwise, the permissible frequency deviation is even smaller. The necessary frequency stability and control accuracy are thus very high, so that tunable crystal oscillators are used for generating the system clock.

In addition, the data resulting from the phase comparison must be fed to the voltage-controlled oscillator, which is a tunable crystal oscillator forming part of a separate monolithic integrated circuit, so that additional terminals and interconnecting leads are required for both integrated circuits.

Another problem arises if such chroma control circuits are used in television receivers with two or more receiving units which present the information from two or more signal sources or television channels on the screen simultaneously. Each of those receiving units requires a separate clock system whose frequency must be synchronized with the frequency of the respective color-burst signal. With the small differences in the frequencies of the various received color-burst signals, interaction of the associated voltage-controlled oscillators is hardly avoidable, which results in interferences on the screen. The greater the lock-in range of the tunable crystal oscillators, the stronger the interaction will be, because the frequency stability of the oscillators decreases with increasing lock-in range.

SUMMARY OF THE INVENTION

Accordingly, one object of the invention is to improve the prior art chroma control circuit in such a way that the system clock need not be locked to four times the frequency of the originally received chrominance subcarrier, so that it can be locked to other system-related signals, such as a fixed-frequency signal, and that the phase-locked loop is an all-digital circuit.

The fundamental idea of the invention is to achieve the correct adjustment of the frequency and phase between the system clock, which forms the receiver reference system, and the color-burst signal not by locking the system clock to four times the frequency and four times the phase of the color-burst signal by means of a voltage-controlled oscillator, i.e., by analog means, as has been done so far, but by leaving the frequency and phase of the system clock unchanged and taking the necessary locking measures on the received color-burst and chrominance signals. The phase of the digitalized burst signal is, therefore, rotated with respect to the zero phase of the receiver reference system purely digitally by means of a phase-locked loop until it is −180° or +/−135° in accordance with the NTSC or PAL television standard, respectively; at the same time, frequency equality is established between the rotated burst signal and the system clock. The necessary correction angle is then applied to the chrominance signal too. In case of large frequency differences between the original received color-burst signal and the system clock, the correction of the chrominance signals during the scanning line must be interpolated.

A special advantage of the invention that one or more chroma control circuits in accordance with the invention can be added to the prior art chroma control circuit to produce a television receiver for multipicture reproduction that has only a single system clock for all receiving systems.

Another important advantage is that the system clock can be synchronized with signals which are locked to the horizontal frequency or a multiple thereof. This offers advantages during operation of a video recorder and in signal processing for picture enhancement as is performed, for example, to obtain a flicker-free television picture.

Finally, the necessary interpolation of the chroma correction during the scanning line is achieved by the invention in an advantageous manner even in case of large frequency differences between the originally received color-burst signal and the system clock.

BRIEF DESCRIPTION OF THE DRAWINGS

The invention will be better understood from a reading of the following detailed description in conjunction with the drawing in which.

DETAILED DESCRIPTION

As the circuits shown in the figures process digital signals, the lines interconnecting the subcircuits, which usually symbolize single conductors, are to be understood as buses over which multidigit signals are transferred, particularly in parallel.

Figure 1:
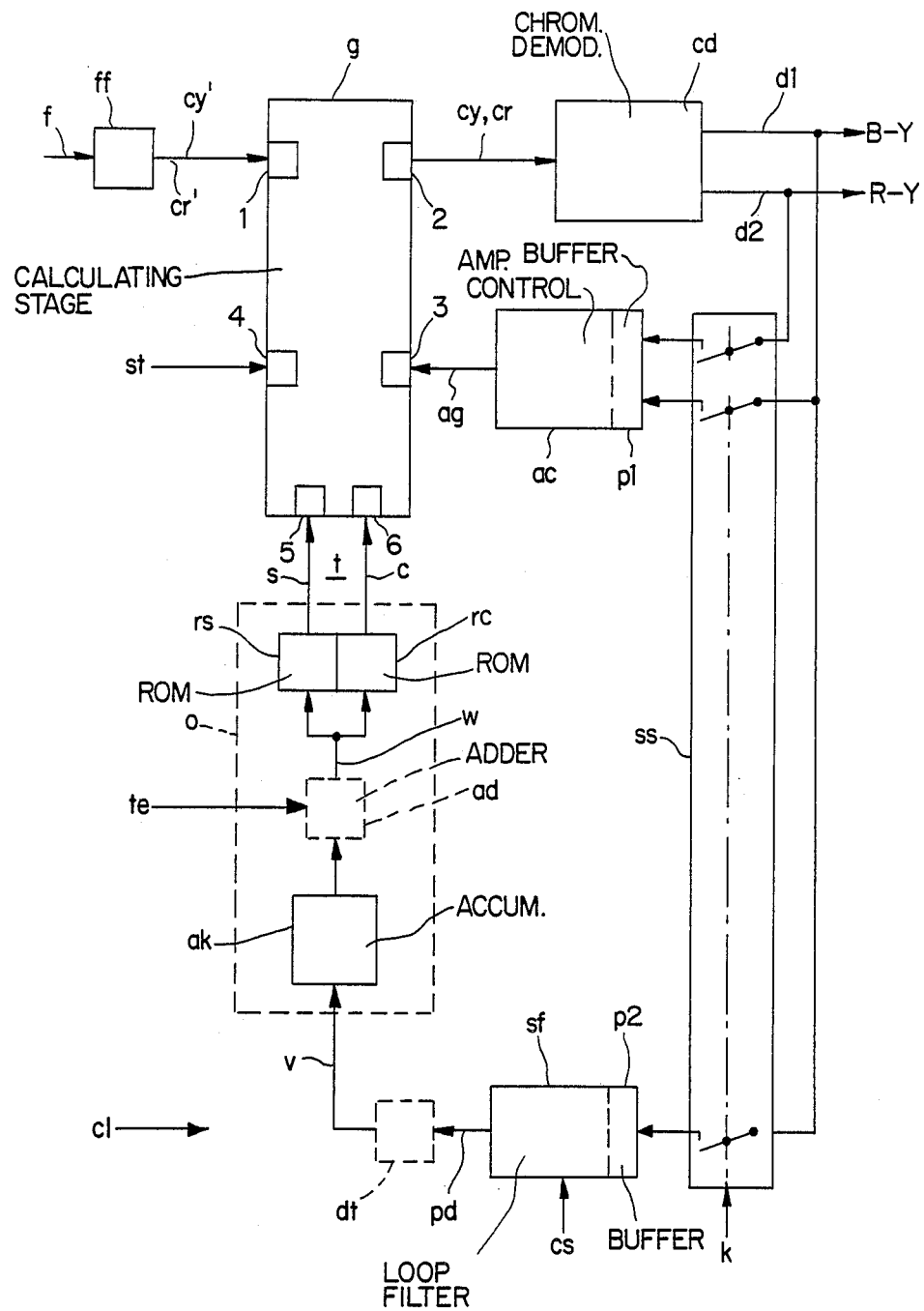
FIG. 1 is a block diagram of an embodiment of the invention.

In the block diagram of FIG. 1, the digital composite color signal f, derived in a known manner from the transmitted and received television signal, is fed to the chrominance filter ff, which has its output connected to the chroma input 1 of the calculating stage g. The latter performs the processing operations necessary for burst-amplitude control, saturation adjustment, and chroma adjustment. It therefore contains at least one multiplier and one adder-subtracter. The chroma output 2 of the calculating stage g supplies the color-burst signal cy and the chrominance signal cr as a composite signal to the input of the chrominance demodulator cd, which delivers the two standard color-difference signals, the B-Y signal d1 and the R-Y signal d2. The latter are fed to further subcircuits (not shown), but each of them is also fed through the make contact of one of the "decks" of the electronic gang switch ss to one of the two inputs of the burst amplitude control circuit ac, which is preceded by the first buffer p1, in which the two input signals are stored when the make contacts, which are closed by the first gating pulse k for the duration of this pulse, are open. The output signal, the burst amplitude control value ag, is fed to the burst control input 3 of the calculating stage g.

The saturation adjustment signal st, with which the color saturation can be changed via a control circuit for a manual control, is fed to the saturation input 4 of the calculating stage g.

According to a feature of the invention, the chrominance demodulator cd is used as aphase comparator which derives the B-Y color-difference signal d1 as a phase-difference signal from the color-burst signal cy and applies it through make contacts of the electronic gang switch ss, which is controlled by the first gating pulse k, to the input of the loop filter sf. The latter contains at the input end the second buffer p2, which stores the data value of the B-Y color-difference signal d1 while the make contacts of the electronic gang switch ss are open. The loop filter sf is also supplied with the loop-filter clock cs, whose frequency is lower than the frequency of the system clock c1, e.g., 1/16 of the system-clock frequency. Since the loop filter sf blocks the horizontal frequency and passes lower frequencies that are important for the phase control process, a digital filter can be used which takes up less chip area than if it were operated with the system clock c1.

Thus, during the time the color-burst signal cy is applied to the chrominance demodulator cd, the B-Y color-difference signal d1 is a measure of the phase difference between the burst signal cy and the system clock c1; however, the phase difference occurs as the sine value of the phase-difference angle. The output of the loop filter sf is the filtered phase-difference signal pd, which, according to a further feature of the invention, is fed, preferably through the differentiator dt, to the accumulator ak of the digital oscillator o. The output of the differentiator dt, to the angular-velocity signal v. For the phase-locked loop, the differentiator dt provides proportional control action; if the filtered phase-difference signal pd is applied to the accumulator ak direct, practically integral control action is provided.

Since the filtered phase-difference signal pd is sinusoidal, the angular-velocity signal v after the differentiator dt has the shape of a cosine wave. A cosine-shaped signal which may differ from that signal only by its sign would be obtainable if the loop filter osf were connected to the R-Y color-difference signal d2, because the latter corresponds to the cosine value of the phase-difference angle.

The digital oscillator o, together with the hue adjuster t, generate the hue adjustment angle w, whose value decreases or increases constantly in accordance with the phase difference. The digital oscillator o, whose outputs, the sine-wave signal s and the cosine-wave signal c, are fed, respectively, to the sine input 5 and the cosine input 6 of the calculating stage g, also produces the approximately constant "speed of rotation" of the hue adjustment angle w. The latter is thus the above-mentioned correction angle for the originally received color-burst signal cy' and the originally received chrominance signal cr'.

The control action explained above is also provided if the frequency of the system clock c1 varies within a wider range than that mentioned above; this frequency may vary by at least +/−0.25%o of four times the chrominance-subcarrier frequency, for example.

The output of the accumulator ak is coupled to the first input of the adder ad, whose second input is supplied with the hue adjustment signal te. This signal permits the correction of hue errors caused by propagation time delays on the transmission path, which are particularly disturbing in the NTSC color-television standard. The hue adjustment angle w is the sum signal provided by the adder ad, and this signal is fed to the first and second read-only memories rs, rc, which deliver the sine-wave signal s and the cosine-wave signal c for the respective hue adjustment angle w.

The instantaneous phase of the system clock c1 figures in the signal processing only during the digitization of the analog composite color signal, while the other subcircuits are only synchronized by the system clock c1 or the loop-filter clock. For this reason, the system clock c1 is indicated in FIGS. 1 and 2 by a general arrow as being applied only once.

Figure 2:
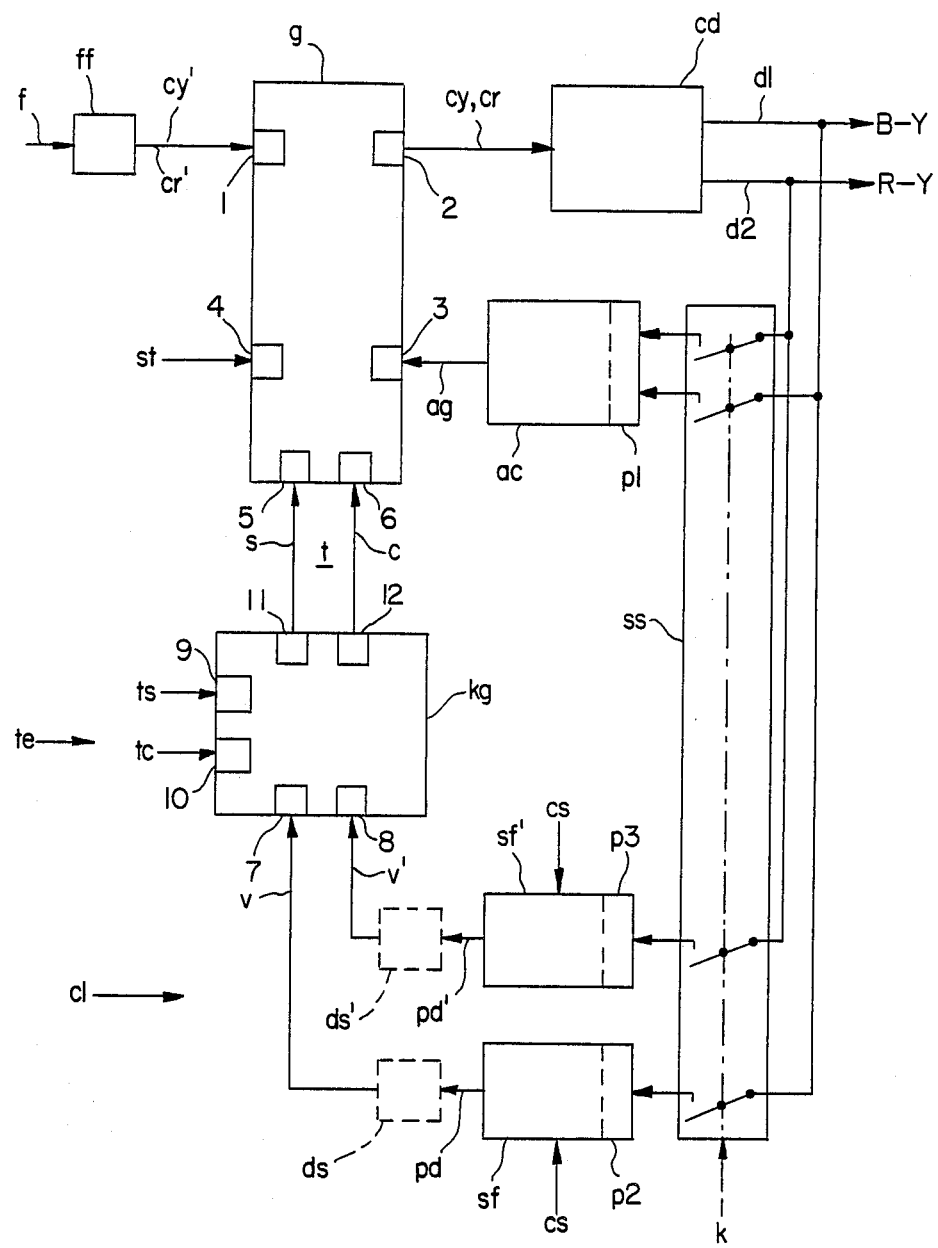
FIG. 2 is a block diagram of a further embodiment of the invention.

In the block diagram of FIG. 2, the digital composite color signal f passes through the chrominance filter ff and is applied to the chroma input 1 of the calculating stage g. The output of the latter, the chroma output 2, provides the color-burst signal cy and the chrominance signal cr as a composite signal, and is connected to the input of the chrominance demodulator cd. The outputs of the chrominance demodulator cd are the two standard color-difference signals, the B-Y signal d1 and the R-Y signal d2, which are fed to further circuits (not shown) for color processing. The B-Y color-difference signal d1 is also applied through the make contacts of two associated "decks" of the electronic gang switch ss to one input of the burst amplitude control circuit ac and to the input of the loop filter sf. The R-Y color-difference signal d2 is also applied through the make contacts of two associated "decks" of the electronic gang switch ss to the other input of the burst amplitude control circuit ac and to the input of the additional loop filter sf', which has the same frequency response and gain as the loop filter sf and, like the later, is clocked by the loop-filter clock cs.

the burst amplitude control circuit ac is preceded by the first buffer p1, which stores the input data when the make contacts of the associated decks of the electronic gang switch 22 are open. The output signal, the burst amplitude control value ag, is fed to the burst control input 3 of the calculating stage g. The input portion of the loop filter sf contains the second buffer p2, and the input portion of the additional loop filter sf' the third buffer p3, which store the respective input data when the make contacts of the associated decks of the electronic gang switch ss, which is controlled by the burst gating pulse k, are open.

The phase-difference signal pd provided by the loop filter sf is fed to the first differentiating stage ds, whose output, the angular-velocity signal v, is applied to the first input 7 of the auxiliary calculating stage ag. The output of the additional loop filter sf', the additional phase-difference signal pd', is fed to the second differentiating stage ds', whose output, the additional angular-velocity signal 2', is applied to the second input 8 of the auxiliary calculating stage hg.

The two output signals of the loop filters sf, sf' may also be fed directly to the auxiliary calculating stage hg. Since the signals applied to the auxiliary calculating stage from the chrominance demodulator cd are sine-or cosine-wave signals, the interchange of the signals at an interface has the same effect as their differentiation, possibly except for the sign.

The use of the output signals of the chrominance demodulator cd as phase-difference values in FIGS. 1 and 2 is made possible by the fact that the amplitude of the color-burst signal is maintained at a constant level by the burst amplitude control circuit ac regardless of the magnitude of the received composite color signal, so that the output signals of the chrominance demodulator cd can be used as sine and cosine values of the phase-difference angle.

The auxiliary calculating stage hg is necessary only if the hue adjustment signal be for correcting hue errors is provided. Otherwise, the angular velocity signal v or the phase-difference signal pd can be applied directly as the sine-wave signal s to the sine input 5 of the calculating stage g, and the additional angular-velocity signal v' or the additional phase-difference signal pd' can be applied directly as the cosine-wave signal c to the cosine input 6 of the calculating stage g.

For the application of the hue adjustment signal te in FIG. 2, a mathematical transformation is necessary which corresponds to the rotation of a given vector in a plane system of rectangular coordinates by a predeterminable angle and is performed in the auxiliary calculating stage ag. To this end, the hue adjustment signal te is fed to the third input 9 of the auxiliary calculating stage hg as a sine component ts, and to the fourth input 10 as a cosine component tc.

The sine component ts and the cosine component tc can be produced in the auxiliary calculating stage hg by means of a third and a fourth read-only memory containing, respectively, the sine values and the cosine values of a quandrant.

For the arithmetic operation, the auxiliary calculating stage hg contains at least one multiplier and one adder-subtracter. The sine output 11 of the auxiliary calculating stage hg provides the sine-wave signal s, which is fed to the sine input 5 of the calculating stage g. The cosine output 12 of the auxiliary calculating stage hg provides the cosine-wave signal c, which is fed to the cosine input 6 of the calculating stage g. In FIG. 2, like in FIG. 1, the sine input 5 and the cosine input 6 of the calculating stage g also form the input of the hue adjuster t.

In the auxiliary calculating stage hg, the following arithmetic operations ar performed:

$$s = v' \cdot tc - v \cdot ts$$

$$c = v \cdot tc + v' \cdot ts$$

Since the bandwidth in the chrominance range is smaller than that in the luminance range, and burst amplitude control, saturation adjustment, and hue adjustment are performed with even smaller bandwidths, a corresponding functional separation is appropriate in the calculating circuits g of FIGS. 1 and 2. In most cases, the saturation adjustment signal st will be multiplied by the burst amplitude control value ag. This multiplication can be done serially, because the two factors change only very slowly. The result of this multiplication, the first intermediate product, is multiplied by the sinusoidal signal s and the cosine-wave signal c to obtain the second and third intermediate products, respectively. The latter are fed to a multiplier designed in such a way that in four system clock periods, at least two successive signals entered through the chroma input 1 are multiplied by the second and third intermediate products, respectively. A fast multiplier of this kind may be constructed using the pipeline technique. The result of this multiplication with subsequent addition or subtraction, which is provided at the chroma output 2, is additionally delayed by the delay introduced by the use of the pipeline technique.

To facilitate an understanding of the operation of the calculating stage g, the arithmetic operation will be shown functionally by the example of four successively sampled instantaneous values C1', S1', C2', S2', which are, respectively, the cosine and sine components of the originally received color-burst signal cy' or the originally received chrominance signal cr' and, thus, the transmitter-coded standard color-difference signals in the following order:

C1': the (B-Y)' color-difference signal,
S1': the (R-Y)' color-difference signal,
C2': the −(B-Y)' color-difference signal, and
S2': the −(R-Y)' color-difference signal, where $C2' = -C1'$ and $S2' = -S1'$ in accordance with the four sampled quadrants of a complete chrominance subcarrier period. Within a calculating cycle, which consists of four clock periods and, thus, corresponds to the complete chromiannce-subcarrier period, the calculating stage g calculates, in addition to the delay introduced by the use of the so-called pipelining technique in the calculating stage g, the sine and cosine components S, C of the chrominance signal cr and the color-burst signal cy rotated by the correction angle, and delivers them alternately at the chroma output 2. The two components are determined from $$S = S1' \cdot ag \cdot st \cdot c - C1 \cdot ag \cdot st \cdot s, \text{ and}$$

$$C = C1 \cdot ag \cdot st \cdot c + S1 \cdot ag \cdot st \cdot s.$$

The chrominance demodulator cd following the calculating stage g is essentially a demultiplexer circuit which separates the alternately delivered sine and cosine components S, C and provides the B-Y and R-Y color-difference signals d1, d2.

What is claimed is:

1. A chroma control circuit for a digital television receiver, said circuit comprising:
   a system clock having a frequency approximately four times the chrominance-subcarrier frequency and which serves as a sampling clock for digitization of an analog composite color signal to provide a digitized composite color signal comprising a received color burst signal and a received chrominance signal, said system clock having a zero reference phase;
   a calculating stage that performs processing operations on said digitized composite color signal to provide burst amplitude control, saturation adjustment and chroma adjustment, said calculating stage providing a color burst output signal and a chrominance output signal;
   a chrominance demodulator having an input receiving a composite signal from said calculating stage which includes said color burst output signal and said chrominance output signal, said chrominance demodulator deriving first and second color difference signals, said first color-difference signal being derived as a phase-difference signal from said color-burst output signal;
   a loop filter having an input receiving said first color-difference signal and providing a filtered phase difference signal;
   a digital oscillator comprising:
     an accumulator;
     a first read only memory containing sine values;
     a second read only memory containing cosine values;
     said accumulator having its output coupled to said first and second read only memories;
     said filtered phase difference signal being coupled to the accumulator; and
     said first and second read only memories having outputs coupled to sine and cosine inputs, respectively, of said calculating stage;
   whereby said calculating stage, said chrominance demodulator, said loop filter and said digital oscillator form a phase-locked loop such that said digital oscillator produces a hue adjustment angle having an approximately constant speed of rotation of;
   said phase locked loop adjusting the frequency of said color burst output signal to one quarter of the frequency of said system clock and controlling the phase of said color burst output signal such that the phase of said first color difference signal is shifted with respect to said zero reference phase of said system clock by −180° for NTSC television standards and by +/−135° for PAL television standards.

2. A circuit in accordance with claim 1, comprising:
   a burst amplitude control circuit receiving said first and second color difference signals and supplying a color saturation adjustment signal to a burst control input of said calculating stage.

3. A chroma control circuit in accordance with claim 1, comprising:
   an adder having a first input connected to the output of the accumulator and having a second input supplied with a hue adjustment signal, said adder being inserted between the accumulator and the first and second read-only memories.

4. A chroma control circuit in accordance with claim 1, comprising:
   a differentiator coupling the output of said loop filter to the input of said accumulator.

5. A chroma control circuit in accordance with claim 2, comprising:
   an adder having a first input connected to the output of the accumulator and having a second input supplied with a hue adjustment signal, said adder being inserted between the accumlulator and the first and second read-only memories.

6. A chroma control circuit in accordance with claim 2, comprising:
   a differentiator coupling the output of said loop filter to the input of said accumulator.

7. A chroma control circuit in accordance with claim 5, comprising:
   a differentiator coupling the output of said loop filter to the input of said accumulator.

8. A chroma control circuit in accordance with claim 2, wherein said phase-locked loop modifies by applying a color burst output signal, said correction angle to said received color-burst signal and said received chrominance signal.

9. A chroma control circuit for a digital television receiver, said circuit comprising:
   a system clock having a frequency approximately four times the chrominance-subcarrier frequency and which serve as a sampling clock for digitization of an analog composite color signal to provide a digitized composite color signal, said system clock having a zero reference phase;
   a first calculating stage that performs processing operations on said digitized composite color signal to provide burst amplitude control, saturation adjustment and chroma adjustment;
   a chrominance demodulator having an input receiving a composite signal from said calculating stage which includes a color burst signal and a chrominance signal, said chorminance demodulator deriving first and second color difference signals, said first color-difference signal being derived as a phase-difference signal from said color-burst signal;
   a first loop filter having an input receiving said first color-difference signal and providing a filtered phase difference signal;
   a second loop filter receiving said second color difference signal;
   an auxiliary calculating stage having first and second inputs coupled, respectively, to the outputs of said loop filter and said second loop filter, and having third and fourth inputs receiving a sine component and a cosine component of a hue adjustment signal;

said auxiliary calculating stage containing at least one multiplier, one adder and one subtractor; said auxiliary calculating stage having first and second oututs coupled to the sine input and the cosine input of said first calculating stage;

whereby said first and auxiliary calculating stage, said chrominance demodulator, said first and second loop filters and said digital oscillator form a phase-locked loop such that said digital oscillator produces a hue adjustment angle having an approximately constant speed of rotation;

said phase locked loop adjusting the frequency of said color burst signal to one quarter of the frequency of said system clock and controlling the phase of said color burst signal such that the phase of said first color difference signal is shifted with respect to said zero reference phase of said system clock by $-180°$ for NTSC television standards and by $+/-135°$ for PAL television standards.

10. A circuit in accordance with claim 9, comprising:
a burst amplitude control circuit receiving said first and second color difference signals and supplying a color saturation adjustment signal to a burst control input of said first calculating stage.

11. A chroma control circuit as claimed in claim 10, wherein:
said auxiliary calculating stage contains a first read-only memory holding the sine values and a second read-only memory holding the cosine values of the first quadrant.

12. A chroma control circuit as claimed in claim 11, comprising:
a first differentiating stage between said first loop filter and said first input of said auxiliary calculating stage; and
a second differentiating stage between said second loop filter and said second input of said auxiliary calculating stage.

13. A chroma control circuit in accordance with claim 10, wherein:
said first calculating stage includes a multiplier between a chroma input and a chroma output, said multiplier operating such that in four system clock periods, at least two successive signals entered through said chroma input are each multiplied by one of intermediate products obtained in said calculating stage.

14. A chroma control circuit as claimed in claim 11, wherein:
said hue adjustment signal is fed as an angular amount to said auxiliary calculating stage, the sine and cosine components of said hue adjustment signal being derived in said auxiliary calculating stage by means of said first and second read-only memories, respectively.

15. A chroma control circuit as claimed in claim 9, wherein:
said system clock is synchronous with a system-related signal having a frequency which is a multiple of the horizontal frequency of said digital television receiver.

16. A chroma control circuit as claimed in claim 9, wherein:
said digital television receiver includes a multipicture display facility for simultaneously displaying pictures provided by different signal sources on the screen of said digital television receiver; and
said system clock is synchronous with the color-burst signal of a single one of said different signal sources.

17. A chroma control circuit as claimed in claim 9, wherein:
said digital television receiver includes a multipicture display facility for simultaneously displaying pictures provided by different signal sources on the screen of said digital television receiver; and
said system clock is synchronous with a signal of a single system-related signal having a frequency that is a multiple of the horizontal frequency of said digital television receiver.

18. A chroma control circuit as claimed in claim 9, wherein:
said digital television receiver includes a multipicture display facility for simultaneously displaying pictures provided by different television channels on the screen of said digital television receiver; and
said system clock is synchronous only with the color-burst signal of a single one of said different television channels.

* * * * *